(12) United States Patent
Cheng et al.

(10) Patent No.: US 9,677,960 B2
(45) Date of Patent: Jun. 13, 2017

(54) PRESSURE SENSING ASSEMBLY (71) Applicant: Nederlandse Organisatie voor toegepast-natuurwetenschappelijk onderzoek TNO, Delft (NL)

(72) Inventors: Lun Kai Cheng, Delft (NL); Peter Martijn Toet, Delft (NL); Rik Jansen, Delft (NL)

(73) Assignee: Nederlandse Organisatie voor toegepast-natuurwetenschappelijk onderzoek TNO, Delft (NL)

( * ) Notice: Subject to any disclaimer, the term of this patent is extended or adjusted under 35 U.S.C. 154(b) by 284 days.

(21) Appl. No.: 14/424,698

(22) PCT Filed: Aug. 29, 2013

(86) PCT No.: PCT/NL2013/050624
§ 371 (c)(1),
(2) Date: Feb. 27, 2015

(87) PCT Pub. No.: WO2014/035243
PCT Pub. Date: Mar. 6, 2014

(65) Prior Publication Data
US 2015/0226622 A1 Aug. 13, 2015

(30) Foreign Application Priority Data

Aug. 30, 2012 (EP) .................................. 12182447

(51) Int. Cl.
*G01L 7/02* (2006.01)
*G01L 7/10* (2006.01)
(Continued)

(52) U.S. Cl.
CPC .............. *G01L 7/041* (2013.01); *E21B 47/06* (2013.01); *G01L 1/246* (2013.01); *G01L 9/0027* (2013.01);
(Continued)

(58) Field of Classification Search
USPC .......................................................... 73/730
See application file for complete search history.

(56) References Cited

U.S. PATENT DOCUMENTS 4,218,926 A * 8/1980 DeVisser ............ G01L 19/0023
73/730
4,594,504 A * 6/1986 Coursolle .............. G02B 6/266
250/227.21
(Continued)

FOREIGN PATENT DOCUMENTS

EP          2338430 A1    6/2011
KR     20100089729 A    8/2010

OTHER PUBLICATIONS

Written Opinion of the International Search Authority—PCT/NL2013/050624—Dated Dec. 2, 2013.

*Primary Examiner* — Clayton E Laballe
*Assistant Examiner* — Warren K Fenwick
(74) *Attorney, Agent, or Firm* — Banner & Witcoff, Ltd.

(57) ABSTRACT

A pressure sensing assembly (1), comprising: an elongate, axially extending tube (100), having a flexible tube wall (102) that encloses an inner pressure chamber (106); and at least one sensor unit (200), including: two tube wall fixation devices (210), connected to the tube wall (102) at respective axially spaced apart positions, and configured to fix respective diameters (D, d) of the tube wall at said positions; and a first strain sensing element (220), connected to the tube wall (102) at a first position axially in between said two tube wall devices (210), and configured to provide a first signal indicative of an axial elongation of the tube wall resulting from a change in axial curvature of the tube wall when a pressure differential between the inner pressure chamber (106) and an outside environment (108) of the tube is applied across the tube wall at said first position.

15 Claims, 5 Drawing Sheets

(51) Int. Cl.
*G01L 7/04* (2006.01)
*G01L 9/00* (2006.01)
*G01L 11/02* (2006.01)
*G01L 1/24* (2006.01)
*E21B 47/06* (2012.01)
*G01D 5/353* (2006.01)

(52) U.S. Cl.
CPC ........ G01L 11/025 (2013.01); *G01D 5/35316* (2013.01); *G01D 5/35387* (2013.01)

(56) References Cited

U.S. PATENT DOCUMENTS

| | | | |
|---|---|---|---|
| 4,925,619 A | 5/1990 | Sparrow et al. | |
| 6,422,084 B1 * | 7/2002 | Fernald | G01L 11/025 250/231.19 |
| 6,962,084 B2 * | 11/2005 | Gall | B60C 23/0408 73/715 |
| 7,196,318 B2 * | 3/2007 | Shin | A61B 5/01 250/227.14 |
| 8,234,931 B2 * | 8/2012 | Cheng | G01F 1/3218 73/861.22 |
| 2005/0103123 A1 | 5/2005 | Newman | |
| 2009/0177095 A1 * | 7/2009 | Aeby | A61B 5/0084 600/478 |
| 2011/0048136 A1 * | 3/2011 | Birch | E21B 47/06 73/705 |
| 2013/0317372 A1 * | 11/2013 | Eberle | A61B 5/02154 600/478 |
| 2015/0141843 A1 * | 5/2015 | Eberle | A61B 5/02154 600/478 |

\* cited by examiner

PRESSURE SENSING ASSEMBLY

CROSS-REFERENCE TO RELATED APPLICATIONS

This application is a U.S. National Stage application under 35 U.S.C. §371 of International Application PCT/NL2013/050624 (published as WO 2014/035243 A1), filed Aug. 29, 2013, which claims priority to Application EP 12182447.8, filed Aug. 30, 2012. Benefit of the filing date of each of these prior applications is hereby claimed. Each of these prior applications is hereby incorporated by reference in its entirety.

FIELD OF THE INVENTION

The present invention relates to a pressure sensing assembly suitable for continuously monitoring a pressure distribution down a borehole of an oil or gas well.

BACKGROUND

For an optimal economic and safe exploitation of a large and complex oil or gas well, it is highly desirable to have the disposal of fluid pressure and fluid temperature data from multiple vertically spaced apart locations within the well's borehole(s). Such pressure and temperature data may, for instance, provide information about which sections of a well produce hydrocarbons, reduce uncertainty in reservoir modelling, optimize placement of new wellheads, promote production by enabling the use of electrical submersible pumps (ESPs) to be tailored to the well-specific situation, and allow for careful well surveillance (e.g. the detection of possibly dangerous gas leaks).

Presently, local pressure and temperature measurements are typically performed using single-point electric or fiber-optic sensors. For accurate and real-time monitoring and diagnostics, however, a pressure sensing assembly capable of continuously determining the pressure and temperature distribution down the borehole is desired.

SUMMARY OF THE INVENTION

It is an object of the present invention to provide for a pressure sensing assembly that enables continuous, real-time monitoring of a pressure and/or temperature distribution at various locations down the borehole of an oil or gas well.

To this end, a first aspect of the present invention is directed to a pressure sensing assembly. The pressure sensing assembly may include an elongate, axially extending tube, having a flexible tube wall that encloses an inner pressure chamber. The pressure sensing assembly may also include at least one sensor unit. The at least one sensor unit may comprise two tube wall fixation devices, connected to the tube wall at respective axially spaced apart positions, and configured to fix respective diameters of the tube wall at said positions. The at least one sensor unit may further comprise a first strain sensing element, connected to the tube wall at a first position axially in between said two tube wall fixation devices, and configured to provide a first signal indicative of an axial elongation of the tube wall resulting from a change in axial curvature of the tube wall when a pressure differential between the inner pressure chamber and an outside environment of the tube is applied across the tube wall at said first position.

Each of the two tube wall fixation devices may be adapted to fix a diameter (or circumferential shape) of the tube wall, e.g. an inner diameter of the tube wall and/or an outer diameter the tube wall. By fixing respective diameters of tube wall at their respective axially spaced apart positions, the tube wall fixation devices serve two distinct purposes.

Firstly, the presence of two axially spaced apart tube wall fixation devices ensures that a deformation of the tube wall due to a pressure differential across the tube wall at a point in between the two tube wall fixation devices remains a local deformation. Without the tube wall fixation devices, or with only one such tube wall fixation device per sensor unit, the pressure differential-induced deformation of the tube wall might extend over a relatively long portion of the tube, in particular a portion larger in length than the axial distance between the tube wall fixation devices. In embodiments of the present invention, this axial distance may typically be on the order of an outer diameter of the tube. The tube wall fixation devices thus enable multiple sensor units to be spaced closely apart without the risk of mutual interference, and so allow for a high axial first strain sensing element density and a high spatial measurement resolution. Secondly, the tube wall fixation devices ensure that a local deformation of the tube wall due to a local pressure differential across the tube wall at a point in between the two tube wall fixation devices results in a change in axial curvature (i.e. curvature in an axial plane) of the tube wall that corresponds to an axial elongation. Without the tube wall fixation devices, the local pressure differential-induced deformation of the tube wall might merely result in a change in the tube wall diameter. The tube wall fixation devices thus enable strain measurements of the tube wall along the axial direction of the tube, and hence determination of the local pressure differential that causes it. This may greatly simplify the production process of the pressure sensing assembly, in particular when strain sensing elements including optical strain sensors are used, as these may at least in some embodiments be incorporated in a single optical fiber that can be applied to the tube wall during or just after the tube extrusion process. In case the optical strain sensors is based on optical fiber e.g. fiber Bragg gratings (FBG's), the optical fiber may even be generally straight, and axially extend along the length of the tube. Such a configuration may further allow the tube to have a significantly smaller diameter than a bend radius of the optical fiber, which may typically be on the order of 20-30 mm, since the optical fiber does not need to be circumferentially wrapped around the tube to detect changes in the tube wall diameter.

In principle, the strain sensing element may include any type of strain sensor to measure the axial elongation of the tube wall. In one embodiment, for instance, the strain sensing element may include an electric strain sensor, such as a strain gauge. The amount of electrical wiring necessary to individually operate a plurality of spaced apart strain gauges applied along the length of the tube, however, may be disadvantageously large in case the tube is relatively long, e.g. tens or hundreds of meters, which is a typical requirement for the aforementioned downhole applications. Furthermore, the reliability of electrical sensors in hostile downhole environments, where the sensors may be exposed to high temperatures and pressures and strong vibrations, may leave to be desired. In a preferred embodiment, the strain sensing element may therefore include an optical strain sensor, in particular a fiber-optic strain sensor, that is better suited for use in harsh environments. Fiber-optic strain sensors may, for example, include fiber interferometric sensors, Fabry-Perot fiber-optic sensors, Brillouin fiber-optic sensors, and fiber loop ringdown sensors. In an especially advantageous embodiment, the fiber-optic strain sensor may include a fiber Bragg grating (FBG), i.e. a type of Bragg reflector that may be constructed in a short segment of optical fiber to reflect particular wavelengths of light and to transmit all others. Accordingly, an FBG may act as a wavelength-specific reflector. In addition, unlike for instance Fabry-Perot fiber-optic sensors, multiple FBG's may be incorporated inline in a single optical fiber. This optical fiber may simply be connected to, e.g. adhesively attached to or embedded in, the tube wall such that it runs along the axial direction of the tube in order to enable distributed measurements along the length thereof.

In one embodiment, the pressure sensing assembly may include only a single sensor unit. Alternatively, in order to allow for distributed pressure measurements along the length of the tube, the pressure sensing assembly may include a plurality of axially spaced apart sensor units. The axial spacing between the sensor units i.e. the axial distance between neighboring or facing tube wall fixation devices of the respective sensor units may be related to the spatial measurement resolution of the pressure sensing assembly: the smaller the spacing, the higher the axial density of the sensor units, and the higher the spatial measurement resolution. In an advantageous embodiment of the pressure sensing assembly, a zero-spacing of sensor units may be obtained by having two axially neighboring sensor units share a tube wall fixation device. That is, two axially neighboring sensor units may include three axially spaced apart tube wall fixation devices, such that an outermost and a middle one of the tube wall fixation device are associated with a first of the sensor units, and the middle and the other outermost of the tube wall fixation devices are associated with a second of the sensor units.

In another embodiment, the two tube wall fixation devices of at least one sensor unit may be rigidly connected to each other, such that an axial distance between them is invariable. The axially-rigid connection between the tube wall fixation devices may prevent the tube wall from undergoing axial elongations due to axial tensile or compressive loading of the tube wall by external forces. Tensile loading, for instance, may occur in case a long tube is suspended into a downhole. Gravity may then pull on the tube wall to stretch it, which may cause an elongation of the tube wall that is registered by the strain sensing element but is in fact unrelated to any pressure differential across the tube wall. Such undesirable influences on the readings of the strain sensing element's readings may be eliminated by rigidly securing the tube wall fixation devices to each other, for instance by one or more generally axially extending rigid, interconnection rods.

A tube wall fixation device may in principle have any suitable shape that enables it to fix a diameter of the tube wall at the axial position of the tube at which it is provided. In one structurally simple and economically manufacturable embodiment, at least one tube wall fixation device may include a rigid annulus, i.e. a rigid ringlike structure, that extends around and substantially encloses an axial axis of the tube. Here, 'substantially encloses' may be construed to mean that the annulus subtends an angle in the range of 270-360 degrees with respect to the axial axis of the tube, wherein angles of 270 degrees and 360 degrees correspond to a three-quarter and a full encirclement of the axial axis, respectively. In case the annulus is configured to fix an inner diameter of the tube wall, the annulus may be provided inside the inner pressure chamber and be connected to an inner side of the tube wall. In case the annulus is configured to fix an outer diameter of the tube wall, the annulus may circumferentially extend around the tube wall and be connected to an outer side of the tube wall. In yet another embodiment, the annulus may be at least partially embedded inside the tube wall, for instance to fix a diameter intermediate the inner and outer diameters of the tube wall.

In embodiments of the pressure sensing assembly featuring a plurality of axially spaced apart sensor units, each of the tube wall fixation devices of the sensor units may include a rigid annulus that extends around and substantially but not fully encloses the axial axis of the tube, such that it includes a circumferential discontinuity. The circumferential discontinuities of the annuli may preferably be aligned in the axial direction, and be used to receive and guide electrical wiring and/or optical fiber(s) that connect to and/or interconnect the strain sensing elements. In particular when the annuli extend around the tube wall, their aligned circumferential discontinuities may facilitate attachment of the electrical wiring/optical fiber(s) to the outer side of tube wall.

The tube of the pressure sensing assembly may generally extend between a first end and a second end. In one embodiment, the inner pressure chamber of the tube may be sealed at one of said ends. In such an embodiment, the other end may be open and be connected to a pressure source, e.g. a compressor, so as to actively maintain a fluid contained inside the pressure chamber at a desired, controllable (reference) pressure. In an alternative embodiment, the inner pressure chamber may be sealed at both ends, such that the inner pressure chamber defines a sealed fluid chamber that nay be filled with a possibly pre-pressurized fluid at a certain reference pressure.

The first signal provided by the first strain sensing element may be influenced by environmental temperature changes, a phenomenon generally referred to as thermal drift. To enable the identification of and compensation for thermal drift, a sensor unit may include a temperature sensor of any sort. The temperature sensor may be disposed at a second position that is near the first position of the first strain sensing element such that, during use, the two sensors experience substantially the same environmental temperature. In a preferred embodiment, the temperature sensor may include a second strain sensing element that is identical to the sensor unit's first strain sensing element. Accordingly, the first and second strain sensing elements will experience the same thermal drift. Yet, the second strain sensing element may be positioned such that it is not subjected to strain. To this end the second sensor may be connected to the tube wall at a second position that is not axially in between the sensor unit's two tube wall fixation devices and at which the tube wall undergoes substantially no axial elongation when a pressure differential between the inner pressure chamber and an outside environment of the tube is applied across the tube wall at said second position. The second strain sensing element may, for instance, be provided underneath an annulus of a tube wall fixation device of the sensor unit, where the tube wall is generally prevented from deforming. Alternatively, it may be provided somewhat axially outside of the two tube wall fixation devices of the sensor unit, at a position where radial pressure differentials across the tube wall merely effect variations in a diameter of the tube wall, and no axial elongations. A second signal provided by the temperature sensor/second strain sensing element may be indicative of an environmental temperature at the axial position the sensor unit, and thus of the thermal drift experienced by the first strain sensing element. Accordingly, the second signal may be used to correct the thermal drift of the first signal.

In an embodiment, the pressure sensing assembly may further comprise an interrogator that is operably connected to the first strain sensing element of the at least one sensor unit, and configured to read out the first strain sensing element to obtain the first signal. The assembly may further comprise a controller that is operably connected to the interrogator and configured to determine a pressure value reflecting a pressure at the first position from said first signal. The pressure value may, for instance, be the value of the differential pressure across the tube wall or the absolute value of the environmental pressure at the first position. In an elaboration of such an embodiment suitable for compensating for thermal drift, the interrogator may further be operably connected to a second strain sensing element of the sensor unit, and configured to read out the second strain sensing element to obtain a second signal. In this case, the pressure value determined by the controller may be a thermal drift-corrected or temperature-corrected pressure value determined from both the first and the second signal.

Although the presently disclosed pressure sensing assembly is particularly suitable for downhole applications, its envisaged use is not limited thereto. In principle, it may be used advantageously for any application where the optionally continuous performance of spatially distributed pressure measurements is desired.

These and other features and advantages of the invention will be more fully understood from the following detailed description of certain embodiments of the invention, taken together with the accompanying drawings, which are meant to illustrate and not to limit the invention.

DETAILED DESCRIPTION

Figure 1:
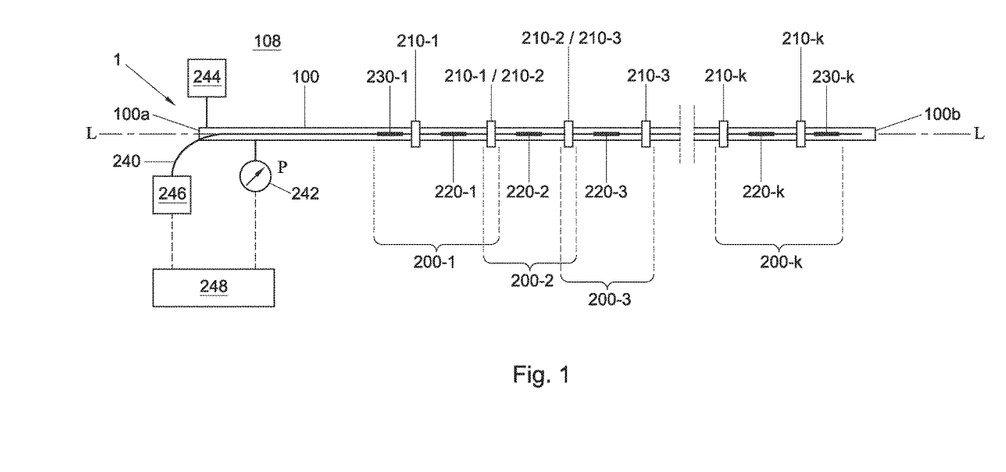
FIG. 1 schematically illustrates an exemplary embodiment of a pressure sensing assembly according to the present invention, including an elongate tube along which a plurality of sensor units are provided.
Figure 2:
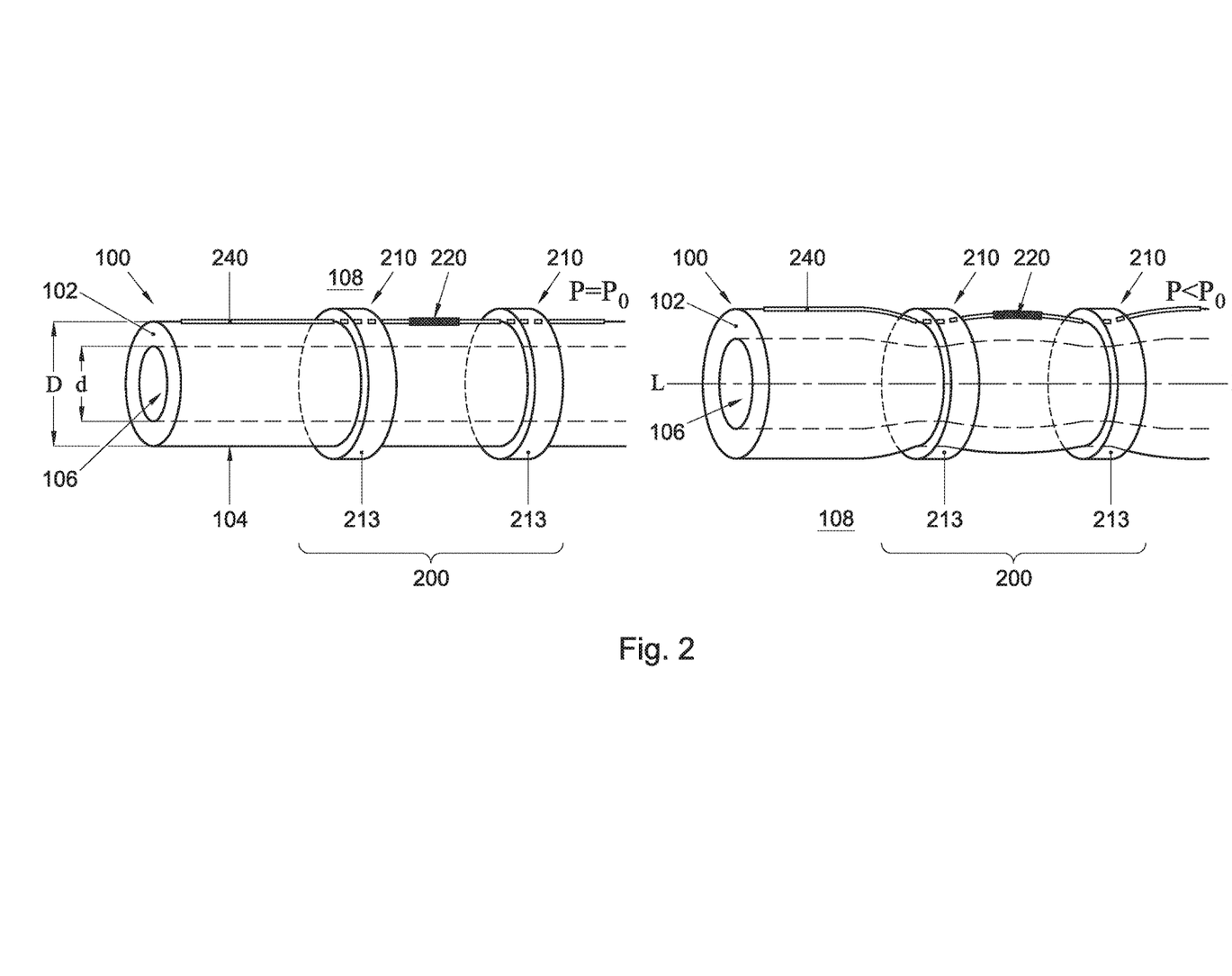
FIG. 2 schematically illustrates in two perspective views the construction and operation of a sensor unit with a single strain sensing element comprising a fiber Bragg grating (FBG)
Figure 3:
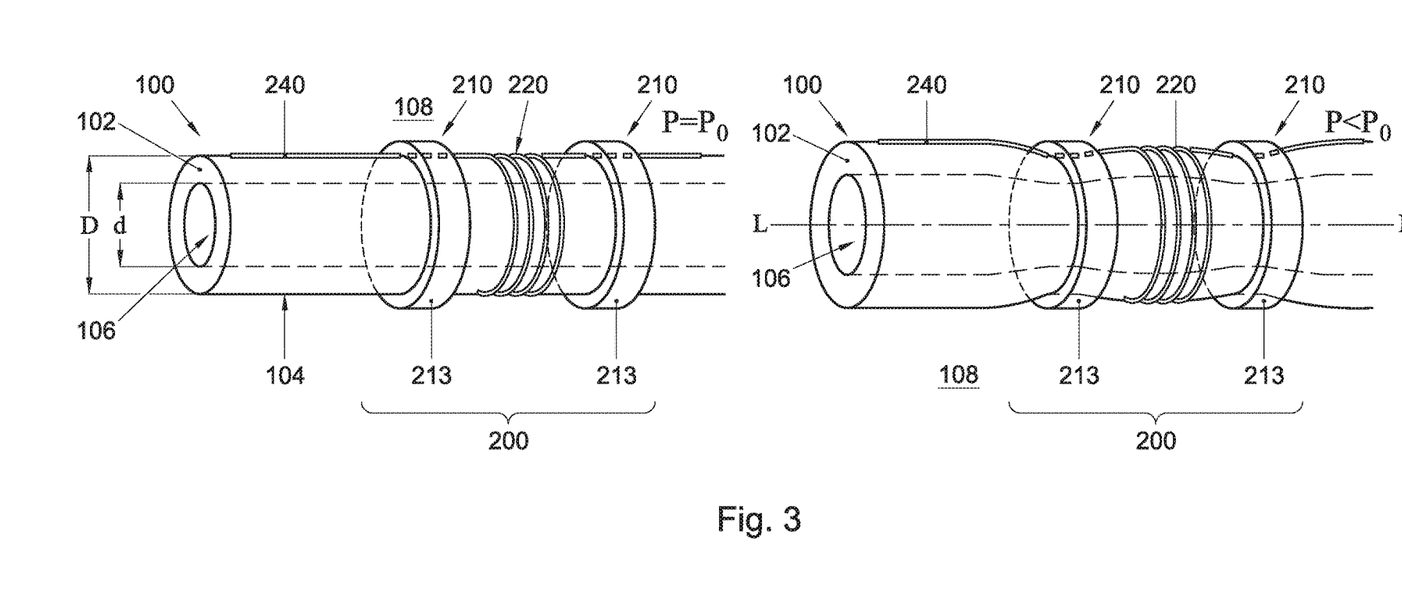
FIG. 3 schematically illustrates in two perspective views the construction and operation of a sensor unit with a single strain sensing element comprising a Brillouin scattering fiber-optic sensor.
Figure 4:
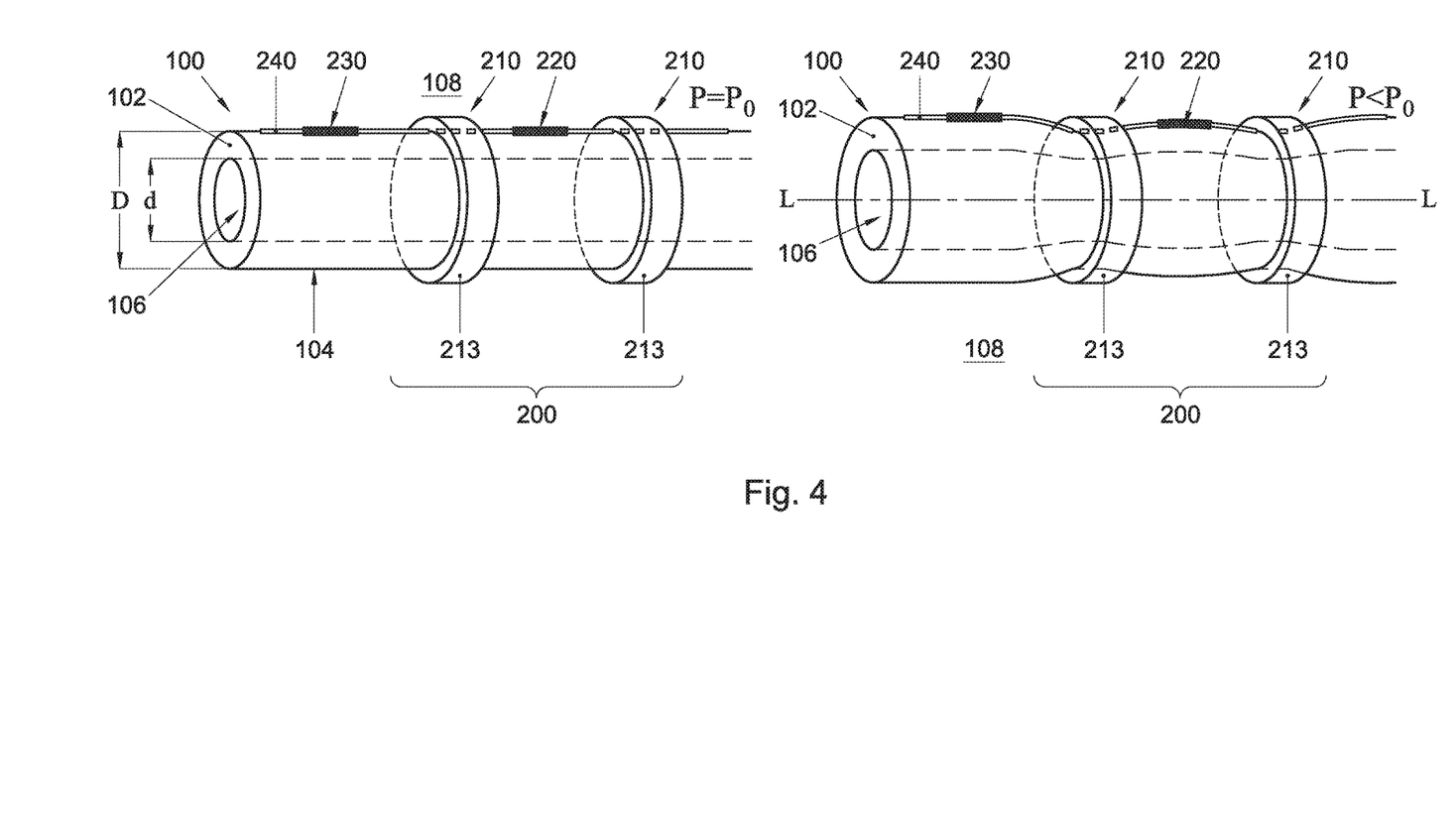
FIG. 4 schematically illustrates in two perspective views the construction and operation of a sensor unit with two strain sensing elements, each comprising a fiber Bragg grating (FBG)
Figure 5:
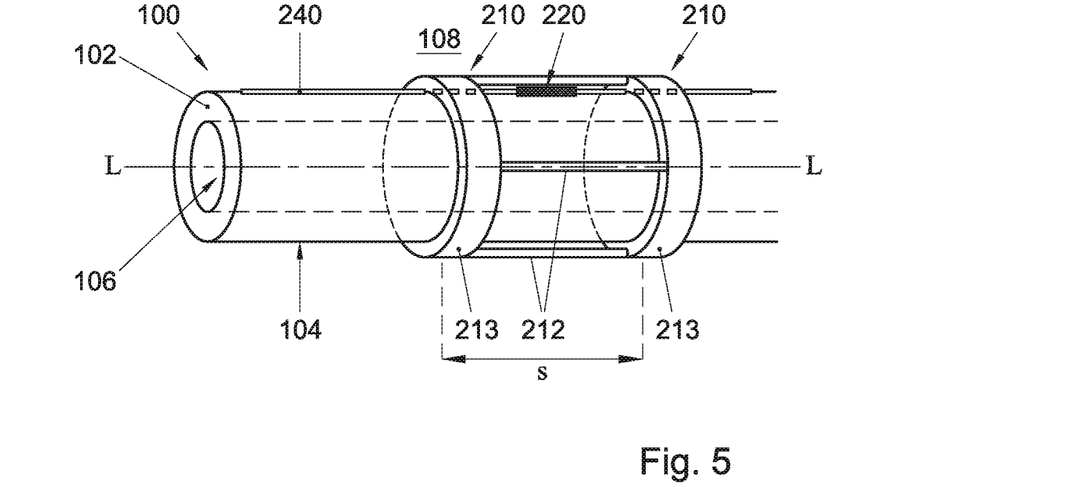
FIG. 5 is a schematic perspective view of a sensor unit whose two tube wall fixation devices are rigidly interconnected.

FIG. 1 schematically illustrates an exemplary pressure sensing assembly 1 according to the present invention, including an elongate tube 100 along which a plurality of sensor units 200-1, 200-2, 200-k are provided. FIG. 2 shows two schematic perspective views of a longitudinal portion of the tube 100 including one such sensor unit 200 in more detail; the left and right perspective views illustrate the tube 100 in an undeformed and a deformed state, respectively. FIGS. 3-5 schematically illustrate alternative embodiments of a sensor unit 200 according to the present invention. Below the construction and operation of the pressure sensing assembly 1 according to the present invention will be expounded in general terms, and with reference to FIGS. 1-5 where applicable.

Referring now to in particular FIGS. 1 and 2. The tube 100 of the pressure sensing assembly 1 may extend along an axis L between a first end 100a and a second, opposite end 100b, and have a flexible, preferably resiliently deformable tube wall 102 that encloses an inner, axially extending pressure chamber 106. The tube wall 102 may have a preferably cylindrical cross-section, and any suitable length, which, for downhole applications, may typically be at least ten meters, e.g. more than hundred meters or even more than thousand meters. In addition, the tube wall 102 may have any suitable inner diameter d and outer diameter D. For ease of manufacturing, these diameters d, D may preferably be uniform along the length of the tube 100. In a preferred embodiment, the outer diameter D may be less than 15 mm. The inner diameter d, and hence the thickness of the tube wall 102, may be dimensioned to ensure that the tube wall 102 is capable of withstanding the anticipated pressure differentials. In general, a smaller the wall thickness D-d corresponds to a more sensitive pressure sensing assembly. The tube 100 may be made from any suitable material, for instance metal, plastic, composite or rubber, and be manufactured through any suitable process, e.g. an extrusion process.

Typically, at least one of the first and second ends 100a, 100b of the tube 100 may be closed off, such that the inner pressure chamber 106 is not in fluid communication with an outside environment 108 at said closed off end. In one embodiment both the first and second ends 100a, 100b may be closed off, such that the inner pressure chamber 106 defines a sealed fluid chamber that may be filled with a possibly pre-pressurized fluid at a certain reference pressure $P_0$. In another embodiment, one of the first and second ends 100a, 100b may be closed off, while the other end is open and connected to a pressure source 244, e.g. a compressor, so as to actively maintain a fluid contained inside the pressure chamber 106 a certain reference pressure $P_0$. In either embodiment, one or more reference pressure sensor(s) 242 may be provided to measure the reference pressure $P_0$ at respective positions within the inner pressure chamber 106. The pressure source 224 and/or the reference pressure sensor(s) 242 may be operably connected to a central controller 248, to be discussed infra.

The pressure sensing assembly 1 may include at least one sensor unit 200, and preferably a plurality of sensor units 200-n. In FIG. 1, which shows an embodiment with multiple axially spaced apart sensor units 200-n, the reference numerals 200 are provided with a suffix n, wherein n denotes a number of a respective sensor unit 200 for unique reference. In other Figures illustrating merely one sensor unit 200, and in the text where it does not refer to any sensor unit 200 in particular, the suffix is omitted.

A sensor unit 200 may comprise two optionally identical tube wall fixation devices 210, which may be connected to the tube wall 102 at respective axially spaced apart positions, and be configured to fix respective diameters d, D or circumferential shapes of the tube wall 102 at said positions. The axial spacing between the two tube wall fixation devices 210 of a single sensor 200 unit may typically be on the order of the outer diameter D of the tube 100, and preferably be less than 1000 mm, and more preferably be less than 500 mm.

The manner in which a tube wall fixation device 210 is connected to the tube wall 102 may depend on the diameter it is configured to fix. In general, a tube wall fixation device 210 may include a rigid annulus, i.e. a ringlike structure, 213 that extends around and substantially encloses the axial axis L of the tube 100. Here, 'substantially encloses' may be construed to mean that the annulus 213 subtends an angle in the range of 270-360 degrees with respect to the axial axis L of the tube 100, wherein angles of 270 degrees and 360 degrees correspond to a three-quarter and a full encirclement of the axial axis L, respectively. In the embodiment of FIG. 2 (and those of FIGS. 3-5 too, for that matter), the annuli 213 of the tube wall fixation devices 210 are adhesively attached to an outer surface 104 of the tube wall 102, such that they substantially enclose said tube wall 102 as seen in the circumferential direction. The tube wall fixation devices 210 are thus configured to fix an outside diameter D of the tube wall 102. In alternative embodiments, however, the tube wall fixation devices 210 may be configured to fix an inner diameter d of the tube wall 102, e.g. by attaching the annuli 213 to the inner side of the tube wall 102, or to fix both the inner and outer diameters d, 13 of the tube wall 102, e.g. by embedding the annulus inside the tube wall 102.

Figure 6:
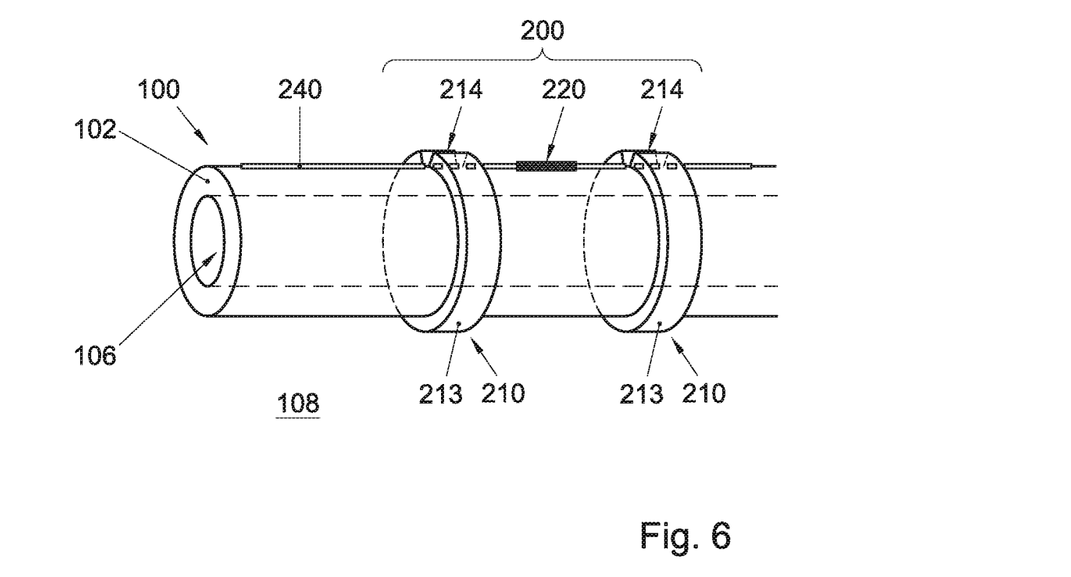
FIG. 6 is a schematic perspective view of a sensor unit whose two tube wall fixation devices include a circumferential discontinuity.

It is understood that the annuli 213 of the tube wall fixation devices 210 of a sensor unit 200 need not necessarily fully enclose or encircle the tube 100. In the embodiment of FIG. 6, for instance, each of the annuli 213 of the sensor unit 200 includes a circumferential discontinuity 214. The circumferential discontinuities 214 of the annuli 213 may be axially aligned, and serve as axial passages for electrical and/or optical cables 240 that connect to and/or interconnect different strain sensing elements 220, 230 provided along the length of the tube 100. As the circumferential discontinuities 214 are provided in annuli 213 that extend around the outer surface 104 of the tube 100, they may provide access to the outer surface 104, and so greatly facilitate application of a string of interconnected strain sensing elements 220, 230 thereto during manufacture of the strain sensing assembly 1.

A sensor unit 200 may further comprise a first strain sensing element 220, connected to the tube wall 102 at a first position axially in between the two tube wall fixation devices 210 of the respective sensor unit 200. The first strain sensing element 220 may be configured to provide a first signal indicative of an axial elongation of the tube wall 102 resulting from a change in axial curvature of the tube wall 102 i.e. curvature in an axial plane when a pressure differential between a pressure inside the inner pressure chamber 106 and a pressure of an outside environment 108 of the tube 100 is applied across the tube wall 102 at said first position. How an axial elongation may result from radial pressure difference may be clarified with reference to the left and right perspective views of FIG. 2; the exposition offered here is equally applicable to the respective perspective views of FIGS. 3 and 4.

The pressure within the pressure chamber 106 may be denoted $P_0$, while the pressure in the outside environment 108 may be denoted P. Hence, when the condition $P=P_0$ is satisfied, as in the left perspective view of FIG. 2, the reference pressure inside the inner pressure chamber 106 is equal to the pressure P of the outside environment 108, and the pressure differential across the tube wall 102 is zero. Consequently, there is no deformation of the tube wall 102, and no pressure differential-induced axial curvature (the radius of axial curvature is infinite). When the condition $P<P_0$ is satisfied, however, as in the right perspective view of FIG. 2, the reference pressure $P_0$ inside the inner pressure chamber 106 exceeds the pressure P of the outside environment 108. As a result, the tube wall 102 may deform and stretch radially outward. At the positions of the tube wall fixation devices 210, the radial expansion of the tube wall 102 is restrained. In between the tube wall fixation devices 210, the action of the pressure differential may cause the tube wall 102 to bulge outward. The bulging, outwardly convex portion of the tube wall 102 may have a decreased (finite) axial curvature and an increased axial length relative to its undeformed state. Both the decrease in axial curvature and the increase in length are directly related to the magnitude of the pressure differential $P-P_0$. It is understood that this description is mutatis mutandis applicable to the situation governed by the condition $P_0<P$, in which case the tube wall 102 would deform and stretch radially inward.

The right perspective view of FIG. 2 clearly illustrates that the two axially spaced apart tube wall fixation devices 210 spatially bound the bulge such that it remains a local deformation. Outside of the tube wall fixation devices 210, the effect of the pressure differential decreases with increasing distance from the respective restraint. The precise distance it takes for the tube wall 102 to regain its infinite axial curvature may be dependent on in particular the magnitude of the pressure differential $P-P_0$ and the stiffness of the tube wall 102. In any concrete case this distance may be determined for a certain maximum expected pressure differential $P-P_0$, and it is beyond this distance that a second strain sensing element 230 (see FIG. 4) may be positioned to identify and compensate for thermal drift, as is discussed infra.

In principle, the first strain sensing element 220 may include any type of strain sensor to measure the axial elongation of the tube wall 102. In one embodiment, for instance, the strain sensing element may include an electric strain sensor, such as a strain gauge. The amount of electrical wiring necessary to individually operate a plurality of spaced apart strain gauges applied along the length of the tube 100, however, may be disadvantageously large in case the tube 100 is relatively long, e.g. tens or hundreds of meters, which is a typical requirement for downhole applications. In another embodiment, the first strain sensing element may include an optical strain sensor, in particular a fiber-optic strain sensor. In especially advantageous embodiments, such as those illustrated in FIGS. 1, 2, 4-6, the fiber-optic strain sensor may include a fiber Bragg grating (FBG), i.e. a type of Bragg reflector that may be constructed in a short segment of optical fiber 240 to reflect particular wavelengths of light and to transmit all others. Accordingly, an FBG may act as a wavelength-specific reflector, and multiple FBG's may be incorporated, inline in a single optical fiber 240, as shown in FIG. 1. This optical fiber 240 may be connected to the tube wall 102, e.g. to the outer surface 104 thereof, such that it runs along the axial direction L of the tube 100 thereby enabling distributed measurements along the length thereof. In alternative embodiments, the fiber-optic strain sensor may for instance include a Fabry-Perot fiber-optic sensor, a Brillouin fiber-optic sensor, and/or a fiber loop ringdown sensor. An exemplary embodiment in which the first strain sensing element 220 includes a Brillouin fiber-optic sensor is illustrated in FIG. 3. At a position in between the tube wall fixation devices 210 of the sensor unit 200, the optical fiber 240 is helically wrapped around tube wall 102. In such a configuration the outer diameter D of the tube wall 102 may have to be larger than the optical fiber's bend radius to prevent it from bending-induced optical loss. A pressure sensing assemblies 1 using first strain sensing elements 220 that include FBG's do not require wrapping of an optical fiber around the tube 100, and may therefore enable the use of smaller-diameter tubes 100 and be easier and more economical to manufacture.

It will be clear that the proper operation of the pressure sensing assembly 1 according to the present invention may depend on the fact that changes in the axial curvature of the tube wall 102 are exclusively related to non-zero radial pressure differentials across tube wall. To prevent other external forces, in particular axially compressive or tensile forces (e.g. due to gravity), from deforming the tube wall 102 and so causing changes in its axial curvature, the tube wall fixation devices 210 of a sensor unit 200 may be rigidly connected to each other, such that an axial distance between them is invariable. FIG. 5 schematically illustrates an embodiment of a sensor unit 200 wherein the two tube wall fixation devices 210 are mutually connected by axially extending rigid interconnection rods 212. The interconnecting rods 212 fix the axial spacing s between tube wall fixation devices 210, absorb axial loads, and hence provide strain relief to the intermediate tube segment.

Another factor that may interfere with the proper operation of the pressure sensing assembly 1 includes temperature variations. During use, the temperature of in particular the outside environment 108 may vary both in time and in space, i.e. along the length of the tube 100. These temperature changes may alter the operating temperature of the first strain sensing element 220 and thus its readings at a same pressure differential. In a first strain sensing element 220 including a fiber Bragg grating, for instance, the wavelength of reflected light may be temperature dependent through thermal expansion of the grating (and practically, of course, also of the tube wall 102 to which it is connected) and temperature dependence of the fiber's refractive index.

To enable the identification of and compensation for temperature variations, a sensor unit, such as sensor unit 200 shown in FIG. 4 and sensor units 200-1 and 200-k in FIG. 1, may include a second strain sensing element 230, 230-1, 230-k, identical to the sensor unit's first strain sensing element 220, 220-1, 220-k, and connected to the tube wall 102 at a position that is not axially in between the sensor unit's two tube wall fixation devices 210, 210-1, 210-k and at which the tube wall 102 undergoes substantially no axial elongation when a pressure differential between the inner pressure chamber 106 and an outside environment 108 of the tube is applied across the tube wall 102 at said position. The second strain sensing element 230, 230-1, 230-k may, for instance, be provided inside the tube 100 (i.e. in the inner pressure chamber 106), or underneath an annulus 213 of a tube wall fixation device 210 of the sensor unit 200, 200-1, 200-k, where the tube wall 102 is generally prevented from deforming. Alternatively, as shown in FIGS. 1 and 4, it may be provided on or in the tube wall 102 at a position somewhat axially outside of the two tube wall fixation devices 210 of the sensor unit 200, 200-1, 200-k, at a position where radial pressure differentials across the tube wall 102 merely effect variations in a diameter of the tube wall 102, and no axial elongations. Or phrased otherwise: the second strain sensing element 230, 230-1, 230-k may be placed outside of the range of influence of the tube wall fixation devices 210, 210-1, 210-k, at least for a predetermined operating range of pressure differentials.

The second strain sensing element 230, 230-1, 230-k may be configured to provide a second signal indicative of an axial elongation of the tube wall 200, just like the first strain sensing element 220, 220-1, 220-k. However, since the second strain sensing element 230, 230-1, 230-k is positioned at a location of the tube wall 102 that is not subjected to axial elongation in the case of radial pressure differentials, the second signal may be interpreted as a reference signal from which a local temperature of the tube wall 102 may be inferred with the help of temperature calibration data. Once the operating temperature of the first and second strain sensing elements is known, the reading from the first strain sensing element 220, 220-1, 220-k may be compensated.

As shown in FIG. 1, the tube 100 of the pressure sensing assembly 1 may support a plurality of axially spaced apart sensor units 200-1, 200-2, ..., 200-k. The spacing between the sensor units 200-1, 200-2, ..., 200-k may generally be chosen as desired to achieve a suitable spatial measurement resolution. In the embodiment of FIG. 1, each two axially neighboring sensor units share a tube wall fixation device 210 to obtain a zero inter-sensor-unit-spacing. For instance, sensor unit 200-1 includes two tube wall fixation devices 210-1, while sensor unit 200-2 includes two tube wall fixation devices 210-2. Together, however, the two axially neighboring sensor units 200-1 and 200-2 merely include three axially spaced apart tube wall fixation devices 210-1, 210-2: an outermost 210-1 and a middle one 210-1/210-2 of the three tube wall fixation devices are associated with sensor unit 200-1, while the middle 210-1/210-2 and the other outermost 210-2 of the tube wall fixation devices 210-1, 210-2 are associated with sensor units 200-2.

The first and second strain sensing elements 220-1, 230-1, 220-2, 230-2, ..., 220-k, 230-k of the plurality of sensor units 200-1, 200-2, ..., 200-k may be individually or groupwise connected to an interrogator 246 configured to read out the respective first and second sensor signals. In a preferred embodiment, the first and second strain sensing elements 220-1, 230-1, 220-2, 230-2, ..., 220-k, 230-k are all fiber-optic strain sensing elements, such that the first and/or the second strain sensing elements may be integrated in a single optic fiber 240 that is connectable to the interrogator 246. In case the first and/or second strain sensing elements 220-1, 230-1, 220-2, 230-2, ..., 220-k, 230-k all include an FBG, for instance, such is practically possible by configuring the FBG's of different sensor units 200-1, 200-2, 200-k to operate at different wavelengths; i.e. the FBG's of a sensor unit 200-1, 200-2, ..., 200-k may be configured to reflect light a wavelength/in a wavelength range that uniquely identifies the respective sensor unit.

The interrogator 246, together with the aforementioned reference pressure sensors 242, may be operably connected to, or be part of, a controller 248 that is configured to convert the first and second signals from the first and second strain sensing elements, obtained by the interrogator 246, into actual pressure differentials $P-P_0$ and/or absolute pressure values for the pressure P of the outside environment 108.

Although illustrative embodiments of the present invention have been described above, in part with reference to the accompanying drawings, it is to be understood that the invention is not limited to these embodiments. Variations to the disclosed embodiments can be understood and effected by those skilled in the art in practicing the claimed invention, from a study of the drawings, the disclosure, and the appended claims. Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, it is noted that particular features, structures, or characteristics of one or more embodiments may be combined in any suitable manner to form new, not explicitly described embodiments.

LIST OF ELEMENTS 1 pressure sensing assembly
100 tube
100a,b first (a) and second (b) end of tube
102 tube wall
104 external surface of tube wall
106 inner pressure chamber
108 outside environment of tube
200-n sensor unit n
210 tube wall fixation device of sensor unit
212 rigid interconnection rod
213 annulus
214 circumferential discontinuity
220 first strain sensing element of sensor unit
230 second strain sensing element of sensor unit
240 optical fiber/fiber-optic cable
242 pressure gauge
244 pressure source
246 optical interrogator
248 controller/processor
L longitudinal axis/axial direction of tube
D outer diameter of tube
d inner diameter of tube
s distance between tube wall fixation device of a single sensor unit
P pressure in outside environment of tube
$P_0$ (reference) pressure within inner pressure chamber

We claim:

1. A pressure sensing assembly, comprising:
an elongate, axially extending tube, having a flexible tube wall that encloses an inner pressure chamber; and
at least one sensor unit, including:
two tube wall fixation devices, connected to the tube wall at respective axially spaced apart positions, and configured to fix respective diameters (d, D) of the tube wall at said positions; and
a first strain sensing element, connected to the tube wall at a first position axially in between said two tube wall fixation devices, and configured to provide a first signal indicative of an axial elongation of the tube wall resulting from a change in axial curvature of the tube wall when a pressure differential between the inner pressure chamber and an outside environment of the tube is applied across the tube wall at said first position.

2. The pressure sensing assembly according to claim 1, wherein the first strain sensing element of the at least one sensor unit includes an optical strain sensor.

3. The pressure sensing assembly according to claim 2, wherein the optical strain sensor of the first strain sensing element of the at least one sensor unit includes an optical fiber based sensor, e.g. a fiber Bragg grating.

4. The pressure sensing assembly according to claim 1, comprising a plurality of axially spaced apart sensor units.

5. The pressure sensing assembly according to claim 4, wherein at least two axially neighboring sensor units have a tube wall fixation device in common.

6. The pressure sensing assembly according to claim 2, wherein the first strain sensing elements of said plurality of sensor units are operably interconnected by an optical fiber.

7. The pressure sensing assembly according to claim 1, wherein at least one of the tube wall fixation devices of the at least one sensor unit includes a rigid annulus that extends around and substantially encloses an axial axis of the tube.

8. The pressure sensing assembly according to claim 6, wherein each of the tube wall fixation devices of the plurality of sensor units includes a rigid annulus that extends around and substantially encloses the axial axis of the tube while including a circumferential discontinuity, and
wherein the optical fiber extends along the tube, through the circumferential discontinuities of the rigid annuli, to operably interconnect the first strain sensing elements of the plurality of sensor units.

9. The pressure sensing assembly according to claim 1, wherein an axial distance between the two tube wall fixation devices of the at least one sensor unit is less than 1000 millimeters.

10. The pressure sensing assembly according to claim 1, wherein the two tube wall fixation devices of the at least one sensor unit are rigidly connected to each other, such that an axial distance between them is invariable.

11. The pressure sensing assembly according to claim 1, wherein the tube extends between a first end and a second end, and wherein the inner pressure chamber is sealed at the second end.

12. The pressure sensing assembly according to claim 11, wherein the inner pressure chamber is sealed at both the first and the second end, and filled with a fluidum.

13. The pressure sensing assembly according to claim 1, wherein the at least one sensor unit includes a second strain sensing element, identical to the first strain sensing element, and connected to the tube wall at a second position that is not axially in between said two tube wall fixation devices and at which the tube wall undergoes substantially no axial elongation when a pressure differential between the inner pressure chamber and an outside environment of the tube is applied across the tube wall at said second position.

14. The pressure sensing assembly according to claim 1, further comprising:
an interrogator that is operably connected to the first strain sensing element of the at least one sensor unit, and configured to read out the first strain sensing element to obtain the first signal; and
a controller that is operably connected to the interrogator and configured to determine a pressure value reflecting a pressure at the first position from said first signal.

15. The pressure sensing assembly according to claim 13, wherein the interrogator is further operably connected to the second strain sensing element of the at least one sensor unit, and configured to read out the second strain sensing element to obtain a second signal, and
wherein said pressure value is a temperature-corrected pressure value determined from both the first and the second signal.

* * * * *